United States Patent
Cook et al.

(10) Patent No.: US 12,431,746 B2
(45) Date of Patent: Sep. 30, 2025

(54) ANTENNA AND ELECTROMAGNETIC SHIELD DISPOSED ON A FLEXIBLE CIRCUIT SUBSTRATE

(71) Applicant: Aptiv Technologies AG, Schaffhausen (CH)

(72) Inventors: James Cook, Poland, OH (US); Evan Wallace, Royal Oak, MI (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 15 days.

(21) Appl. No.: 18/585,930

(22) Filed: Feb. 23, 2024

(65) Prior Publication Data

US 2024/0333043 A1 Oct. 3, 2024

Related U.S. Application Data

(60) Provisional application No. 63/472,867, filed on Jun. 14, 2023, provisional application No. 63/455,713, filed on Mar. 30, 2023.

(51) Int. Cl.
*H01F 27/36* (2006.01)
*H01Q 1/52* (2006.01)
(Continued)

(52) U.S. Cl.
CPC ............ *H02J 50/80* (2016.02); *H01F 27/363* (2020.08); *H01Q 1/526* (2013.01); *H01Q 7/00* (2013.01);
(Continued)

(58) Field of Classification Search
CPC ...... H01F 27/36; H01F 27/361; H01F 27/363; H01F 27/366; H01F 38/14;
(Continued)

(56) References Cited

U.S. PATENT DOCUMENTS

| | | | |
|---|---|---|---|
| 10,277,043 B2* | 4/2019 | Graham | H01F 27/288 |
| 11,811,239 B2 | 11/2023 | Cook | |
| 2010/0308939 A1* | 12/2010 | Kurs | H04B 5/79 |
| | | | 333/219.2 |
| 2014/0070763 A1* | 3/2014 | Chiles | H01F 38/14 |
| | | | 320/108 |

(Continued)

FOREIGN PATENT DOCUMENTS

| | | |
|---|---|---|
| CN | 214590777 U | 11/2021 |
| CN | 219513852 U | 8/2023 |

(Continued)

OTHER PUBLICATIONS

"Extended European Search Report"; European Patent Office; mailed Sep. 23, 2024; 7 Pages.
(Continued)

*Primary Examiner* — Levi Gannon
(74) *Attorney, Agent, or Firm* — Billion & Armitage

(57) ABSTRACT

A wireless power transmitter includes a source coil and a planar short range communication antenna overlaying the source coil. The antenna further includes an antenna element disposed on a first surface of a flexible substrate and a plurality of parallel conductive traces disposed on a second surface of the substrate opposite the first surface. The plurality of parallel conductive traces extend across the substrate from a common shield ground bus located proximate an outer edge of the second surface and provide an electromagnetic shield for the antenna element.

19 Claims, 5 Drawing Sheets

(51) Int. Cl.
*H01Q 7/00* (2006.01)
*H02J 7/00* (2006.01)
*H02J 50/00* (2016.01)
*H02J 50/10* (2016.01)
*H02J 50/23* (2016.01)
*H02J 50/70* (2016.01)
*H02J 50/80* (2016.01)
*H04B 5/79* (2024.01)

(52) U.S. Cl.
CPC .......... *H02J 7/0042* (2013.01); *H02J 50/005* (2020.01); *H02J 50/10* (2016.02); *H02J 50/23* (2016.02); *H02J 50/70* (2016.02); *H04B 5/79* (2024.01)

(58) Field of Classification Search
CPC .... H01F 2038/143; H01Q 1/085; H01Q 1/38; H01Q 1/52; H01Q 1/526; H01Q 7/00; H02J 7/0042; H02J 50/005; H02J 50/10; H02J 50/12; H02J 50/23; H02J 50/70; H02J 50/80; H04B 5/26; H04B 5/263; H04B 5/266; H04B 5/43; H04B 5/79; H04W 4/80
See application file for complete search history.

(56) References Cited

U.S. PATENT DOCUMENTS

| | | | |
|---|---|---|---|
| 2015/0025613 A1* | 1/2015 | Nyberg, II | A61N 1/37229 29/601 |
| 2015/0077296 A1* | 3/2015 | An | H02J 50/12 320/108 |
| 2016/0308401 A1* | 10/2016 | Lee | G06K 19/0715 |
| 2017/0178804 A1* | 6/2017 | Leem | H02J 50/10 |
| 2018/0083493 A1* | 3/2018 | Hwang | H01Q 1/38 |
| 2019/0244752 A1* | 8/2019 | Park | H01F 1/14791 |
| 2019/0386515 A1* | 12/2019 | Leem | H02J 50/402 |
| 2021/0320535 A1* | 10/2021 | Draak | H02J 50/12 |
| 2022/0094201 A1* | 3/2022 | Haug | H02J 50/005 |

FOREIGN PATENT DOCUMENTS

| | | |
|---|---|---|
| KR | 20180120048 A | 11/2018 |
| WO | 2021125565 A1 | 6/2021 |

OTHER PUBLICATIONS

"Machine translation of KR20180120048A"; 27 Pages.
"Machine translation of WO2021125565A1"; 15 Pages.

\* cited by examiner

ANTENNA AND ELECTROMAGNETIC SHIELD DISPOSED ON A FLEXIBLE CIRCUIT SUBSTRATE

CROSS-REFERENCE TO RELATED APPLICATIONS

This application claims the benefit of and priority to U.S. Provisional Application 63/472,867, titled "Antenna and Electromagnetic Shield Disposed on a Flexible Circuit Substrate", filed Jun. 14, 2023, and further claims the benefit of and priority to U.S. Provisional Application 63/455,713, titled "Antenna and Electromagnetic Shield Disposed on a Flexible Circuit Substrate", filed Mar. 30, 2023, the contents of each of which are incorporated by reference herein.

TECHNICAL FIELD

This disclosure is directed to an antenna and electromagnetic shield disposed on a flexible circuit substrate, for example a near field antenna and an electromagnetic interference (EMI) shield of a wireless power transmitter that is disposed on a flexible circuit substrate.

BACKGROUND

Some wireless power transmitters, such as the MAGSAFE® wireless power transmitter developed by Apple, Inc. of Cupertino, California or the Qi 2.0 Magnetic Power Profile (MPP) wireless power transmitter specification developed by the Wireless Power Consortium, use an array of magnets in the wireless power transmitter, hereafter referred to as the transmitter, of a wireless charging device that interfaces with a corresponding array of magnets in a wireless power receiver, hereafter referred to as the receiver, which is housed within a consumer electronic device. The arrays of magnets in the transmitter and the receiver have compatible polarizations that cause the receiver to align with the transmitter and provide physical retention of the receiver to the transmitter. This provides optimal alignment between a receiver coil in the receiver and a source coil in the transmitter, thereby maximizing power transmission efficiency between the transmitter and the receiver.

Automotive wireless power transmitters typically use a standard rigid printed circuit board (PCB) that is located near the interface surface with the device to be charged and have a short range communication antenna, e.g., a near field communication (NFC) antenna, and an electromagnetic interference (EMI) shield embedded in this PCB. As used herein, short range communication means a range of up to 4 cm.

NFC is a set of short range hardware and communication protocols that enables electronic signals to be passed between two electronic devices. NFC is based on inductive coupling between two antennae incorporated into two NFC-enabled devices communicating unidirectionally or bidirectionally, using a frequency of 13.56 MHz and conforming to ISO/IEC protocols.

This antenna PCB is then connected to the transmitter module's control board, usually with a small vertical connector on the NFC antenna/EMI shield PCB and a matching connector on the control board. In contrast, consumer-grade wireless power transmitters, e.g., MAGSAFE® or Qi 2.0 MPP, typically use a thin wire routed around the charging coil supported by a plastic structure or a potting compound for the short range antenna with thin film EMI shielding adhered under the interface surface.

Conventional wireless power transmitters' NFC antenna PCBs can be thick, e.g., more than 0.75 millimeters, which is an issue when integrated with the transmitter charging coil because this thickness limits the magnetic coupling of the transmitter coil to receiver coils. Decreased coil coupling negatively impacts charging performance leading to associated additional heat loss which may negatively affect charge speed performance. Additionally, this decreased coupling can reduce interoperability with market receivers resulting in a poor end user experience for some users, especially those with less common receiver devices.

Furthermore, the decreased coupling may complicate or impede the transmitter's Foreign Object Detection (FOD) capabilities, potentially leading to more false positive detection errors which unnecessarily disable charging causing a poor end user experience, or in a worst case more false negative missed detection events which can pose a safety issue or damage the transmitter or receiver. Due to this, some industry specifications, e.g., MAGSAFE® or Qi2.0 MPP, limit the distance from the transmitter charging coil to the interface surface, which typically results in the use of a thinner interface surface in product designs with such an NFC antenna PCB. This thinner interface surface may not be able to meet robustness and manufacturability needs for certain applications, such as for use in the automotive industry. Additionally, the thick transmitter NFC antenna PCB can cause an issue in some design implementations when integrated with locating magnet arrays because the transmitter and receiver magnets may be too far apart to provide sufficient magnetic attraction and alignment forces between the transmitter and receiver magnets. This design also requires relatively expensive board-to-board connectors to connect the NFC antenna to the control board. The thin wire NFC antenna used in consumer-grade transmitters is not a good match with automotive applications because it presents issues in high-volume manufacturing processes and lacks robustness.

SUMMARY

In some aspects, the techniques described herein relate to a wireless power transmitter, including a source coil and a planar short range communication antenna overlaying the source coil. The antenna includes an antenna element disposed on a first surface of a flexible substrate and a plurality of parallel conductive traces disposed on a second surface of the substrate opposite the first surface. The plurality of parallel conductive traces extends across the substrate from a common shield ground bus proximate to or near to an outer edge of the second surface and provides an electromagnetic shield for the antenna element.

In some aspects, the techniques described herein relate to a method of assembling a wireless power transmitter, including the steps of providing a source coil, disposing an antenna element on a first surface of a flexible substrate and disposing a plurality of parallel conductive traces on a second surface of the substrate opposite the first surface, thereby forming a planar short range communication antenna, and arranging the planar short range communication antenna to overlay the source coil.

BRIEF DESCRIPTION OF THE DRAWINGS

The antenna and electromagnetic shield will now be described by way of example with reference to the accompanying drawings, in which.

DETAILED DESCRIPTION

The antenna and electromagnetic shield will now be described in detail with references to the drawings.

The problem of implementing an NFC antenna and EMI shield into an automotive-grade wireless charging device having an array of alignment magnets, such as a MAGSAFE® or a Qi 2.0 MPP charger, is solved by using a very thin flexible circuit as a substrate for the NFC antenna and EMI shield. MAGSAFE® is a registered trademark of Apple Computer, Inc of Cupertino, California USA.

Figure 1:
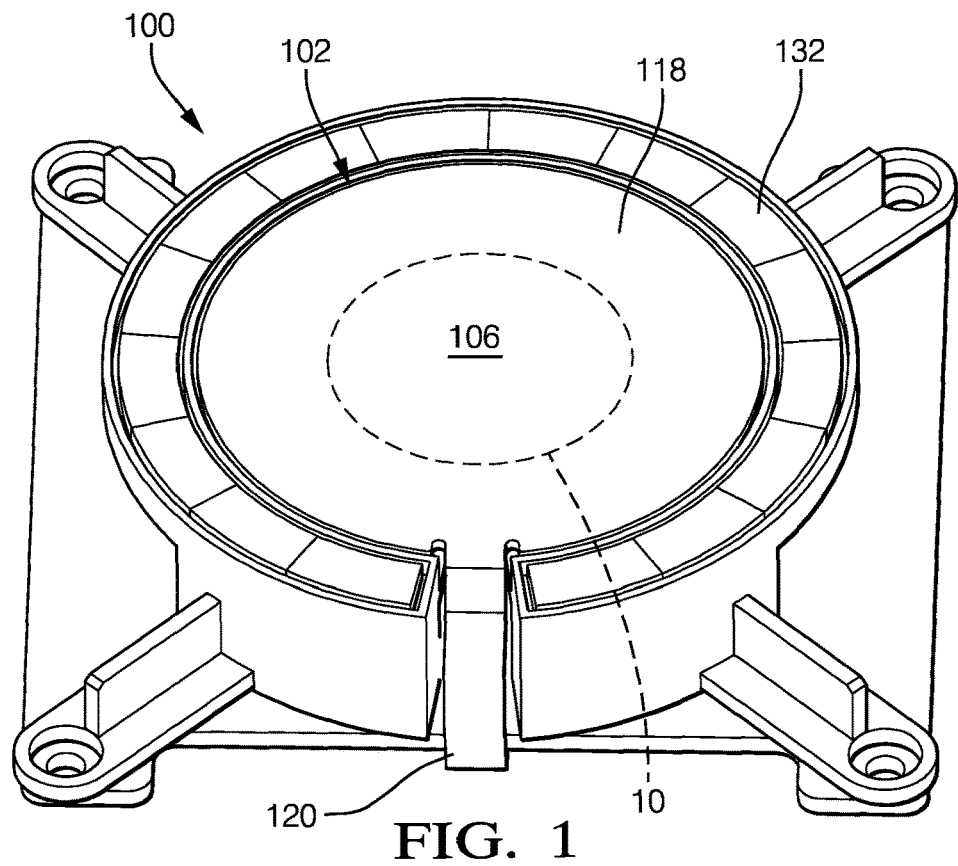
FIG. 1 illustrates an isometric top view of a wireless power transmitter according to some embodiments.
Figure 2:
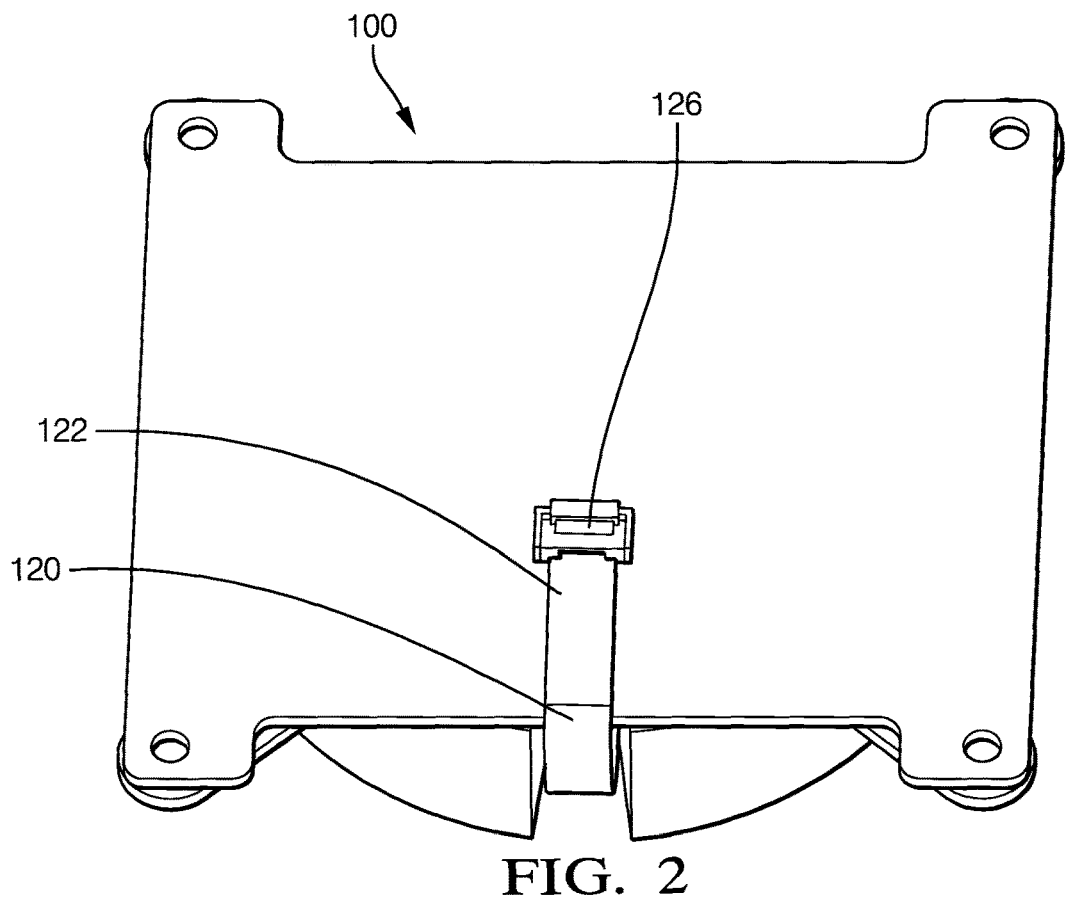
FIG. 2 illustrates an isometric bottom view of the wireless power transmitter of FIG. 1 according to some embodiments.

FIGS. 1 and 2 illustrate a non-limiting example of a wireless power transmitter 100, that includes a source coil 10, a planar short range communication antenna 102 overlaying the source coil 10, and an array of magnets 132 surrounding the short-range communication antenna 102. In some embodiments, the planar short range communication antenna 102 is located approximately co-planar with the array of magnets 132. In some embodiments, the planar short range communication antenna 102 is located in a plane slightly below a top surface of the array of magnets 132. As used herein, "approximately co-planar" means ±10° in any axis of being absolutely co-planar.

Figure 4:
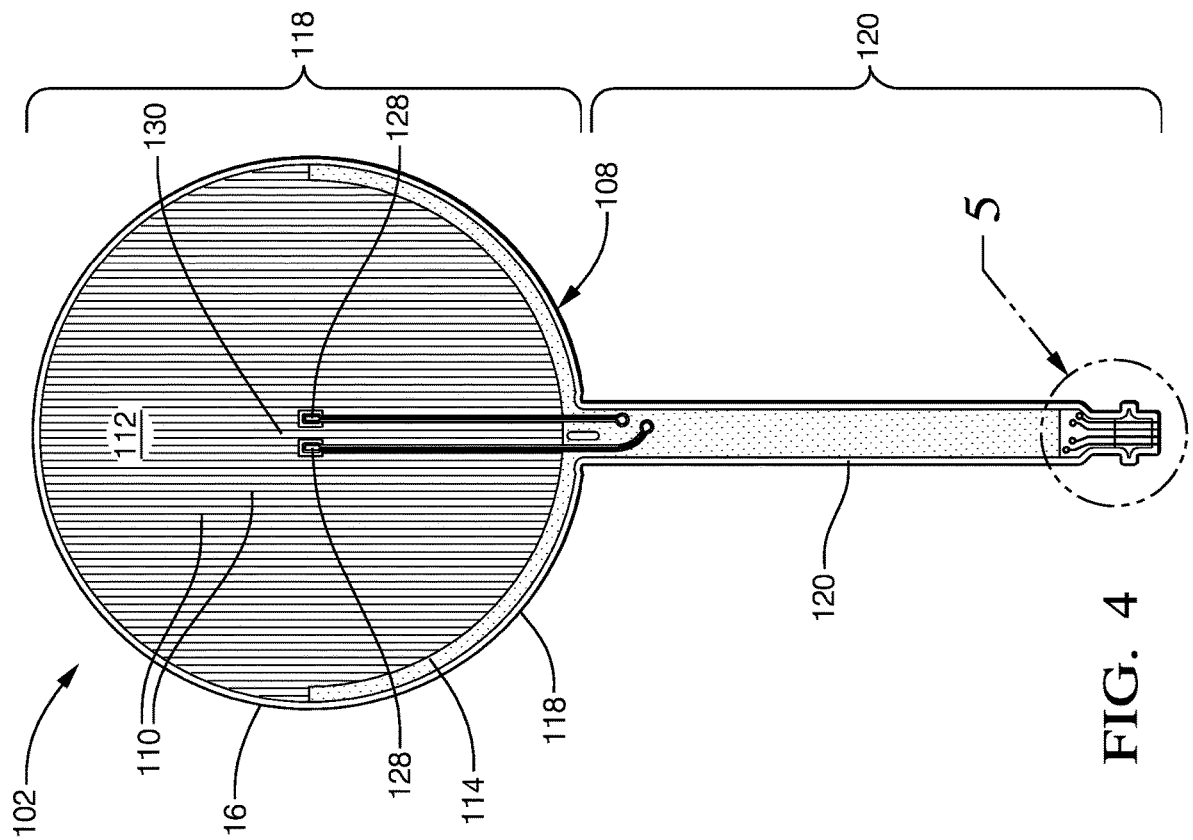
FIG. 4 illustrates a bottom view of the unformed flexible substrate defining an electromagnetic interference (EMI) shield in the unformed condition according to some embodiments.
Figure 3:
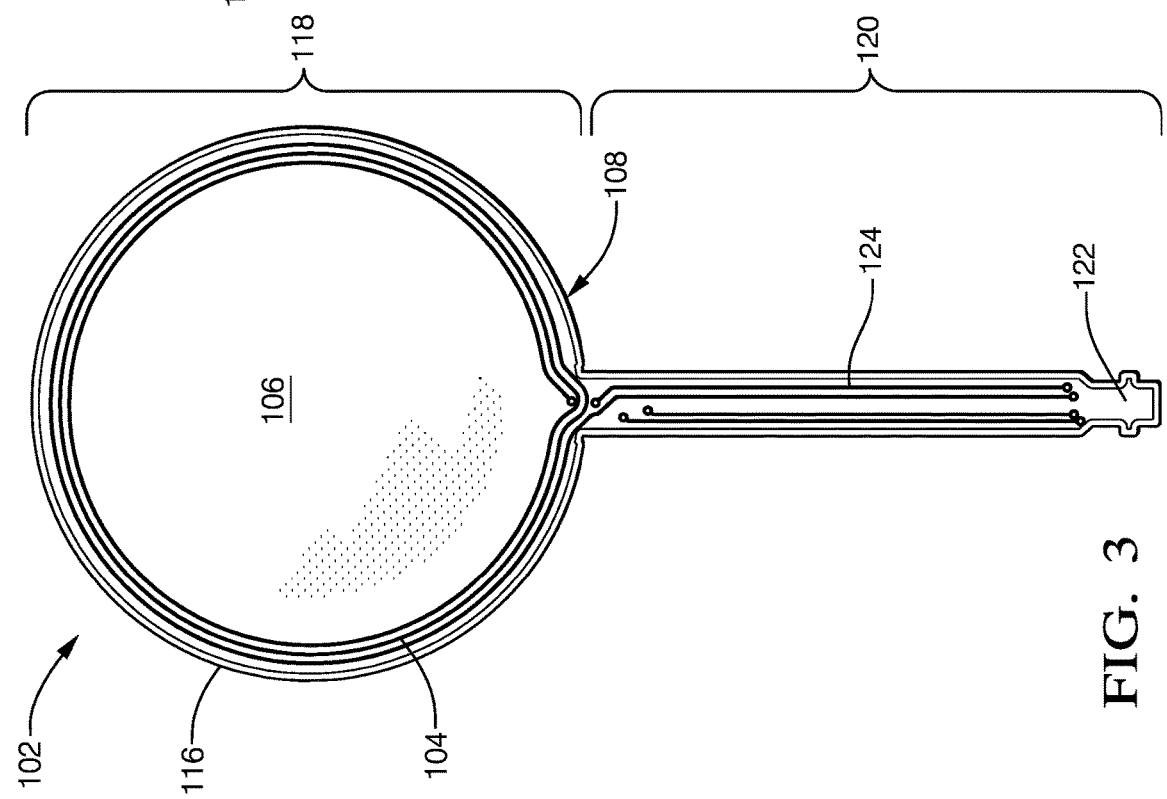
FIG. 3 illustrates a top view of flexible substrate defining a short range antenna in an unformed condition according to some embodiments.

As described in more detail in FIGS. 3 and 4, the short range communication antenna 102 is comprised of a flexible substrate 108 having a substantially round head portion 118 on which an antenna element and an electromagnetic shield are disposed and an elongate tail portion 120 containing consecutive traces connected to a standard flat printed circuit (FPC) electrical connector 122 configured to be connected to a corresponding connector 126. The head portion 118 is round to fit within the circular the array of magnets 132. Referring again to FIGS. 1 and 2, the flexibility of flexible substrate 108 allows the elongated tail portion 120 to be bent/positioned to locate the standard FPC electrical connector 122 on the bottom side of the wireless power transmitter 100. Locating the standard FPC corresponding connector 126 on the bottom side of the wireless power transmitter 100 (as opposed to the top side) allows the wireless power transmitter 100 to be thinner and thus easier to package. Placing the corresponding connector 126 on the bottom of the wireless power transmitter 100 is allowed by bending the tail portion 120 to make the connection to the corresponding connector 126. In some embodiments, this allows a control board having the corresponding connector 126 to be assembled closer to the short range communication antenna 102 which can reduce the overall height of the wireless power transmitter 100. Placing the corresponding connector 126 on the bottom of the wireless power transmitter 100 may also improve manufacturability of some embodiments by allowing the wireless power transmitter 100 to be more easily assembled while upside down. It may also enable placement of the short range communication antenna 102 and the array of magnets 132 closer to the interface between the wireless power transmitter 100 and a corresponding wireless power receiver, leading to improved power transfer performance.

Figure 5:
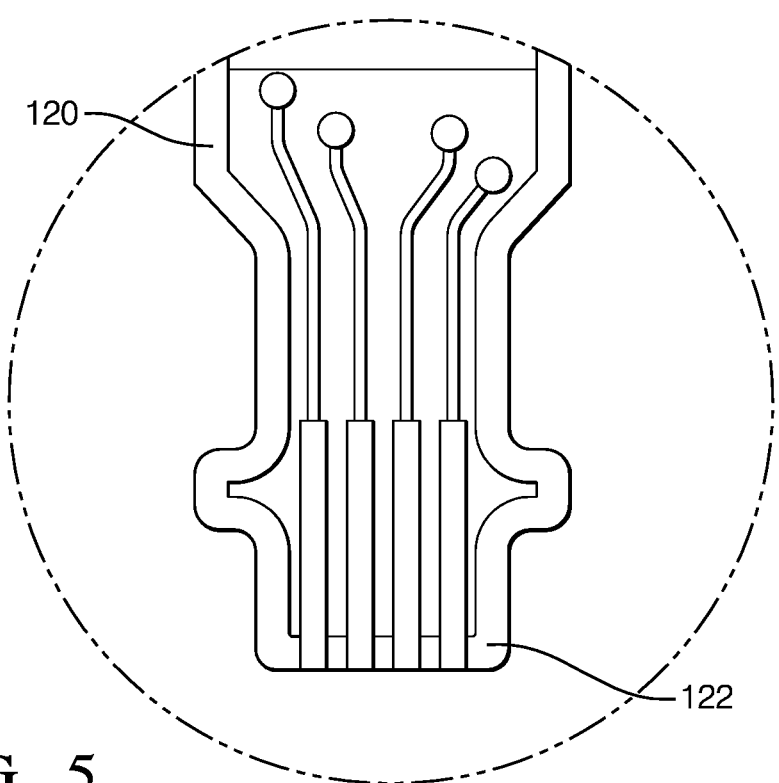
FIG. 5 illustrates a close-up view of a connector end of the flexible substrate of FIG. 4 according to some embodiment.

Referring now to FIGS. 3 and 4, the short-range communication antenna 102 is illustrated in a planar state prior to bending of the elongated tail portion 120 for installation as part of the wireless power transmitter 100 (as shown in FIGS. 1 and 2). FIG. 3 is a top view of the short-range communication antenna 102 and FIG. 4 is a bottom view of the short-range communication antenna. The short-range communication antenna 102 includes a flexible substrate 108 having a top surface 106 and a bottom surface 112. The substrate 108 is formed of a thin flexible polyimide, polyethylene terephthalate, or polyester film. As used herein, the term "thin" means that the substrate 108 has a thickness of about 0.05 mm to 0.5 mm. Substrate thickness of about 0.13 mm, about 0.2 mm, or about 0.25 may be preferred. As used herein the term "about" means #10% of the values listed. The substrate 108 has a substantially round head portion 118 on which the antenna element 104 and the electromagnetic shield are disposed and an elongate tail portion 120 containing consecutive traces 124 connecting a standard flat printed circuit (FPC) electrical connector 122, best shown in FIG. 5, to the antenna element 104 and electromagnetic shield.

The antenna element 104 is disposed on the top surface 106 of the flexible substrate 108. In some embodiments, the antenna element 104 is comprised of several loops that are located proximate to or near to an outer edge 116 of the antenna element 104, located on the substantially round head portion 118 of the flexible substrate 108. In some embodiments, the antenna element 104 is a conductive trace formed of a copper film that is arranged in a generally spiral shape. In some embodiments, spacing between the spiral of the conductive trace is approximately equal to a width of the conductive trace. As used herein "approximately equal" means ±10% of the spacing or widths of the traces of being equal. For example, the spacing between the spiral portions of the conductive trace is about 0.15 mm and the width of the conductive trace is about 0.15 mm. In some embodiments, the spacing between the spiral portions of the conductive trace and the width of the conductive trace could be more or less than 0.15 mm. A plurality of conductive traces 124 extend along the elongated tail portion 120 of the flexible substrate 108 and provide an electrical connection between the antenna element 104 and the standard FPC connector 122. With respect to FIG. 4, a plurality of parallel conductive traces 110 are disposed on a bottom surface 112 of the flexible substrate 108 opposite the top surface 106. The plurality of parallel conductive traces 110 extend across the substrate 108 from a common shield ground bus 114 located proximate to an outer edge 116 of the bottom surface 112 and provides an electromagnetic shield or ground plane for the antenna element 104. In some embodiments, the plurality of parallel conductive traces 110 is also formed of a copper film. In some embodiments, a spacing between each conductive trace in the plurality of parallel conductive traces 110 is approximately equal to the width of each conductive trace in the plurality of parallel conductive traces 110. For example, the spacing between each conductive trace in the plurality of parallel conductive traces 110 is about 0.15 mm and the width of each conductive trace in the plurality of parallel conductive traces 110 is about 0.15 mm.

The short range communication antenna 102 may further comprise at least one thermistor 128. In the illustrated example of FIG. 4, two thermistors 128 are disposed on the substrate 108 in a central region 130 of the head portion 118. The central placement of the thermistors 128 is beneficial because it is easier to manufacture a ferrite magnetic shield used under the source coil 10 with a central pocket to accommodate the thermistors 128 than located elsewhere in the ferrite magnetic shield. The central location is also helpful because they can better monitor the temperature of the charging area of the source coil 10. The thermistors 128 are used primarily as a fail-safe to detect overheating that may occur if a foreign object, such as a metallic coin, near the source coil 10 is not detected by the control system of the wireless power transmitter 100. The thermistors 128 are connected to the electrical connector 122 by their own dedicated conductive traces. The thermistors 128 are utilized to determine the temperature of the source coil 10 and the short range communication antenna 102. The wireless power transmitter 100 may reduce or eliminate power supplied to the source coil 10 when a temperature detected by the thermistors 128 exceeds a temperature threshold, e.g., 85° C.

Figure 6:
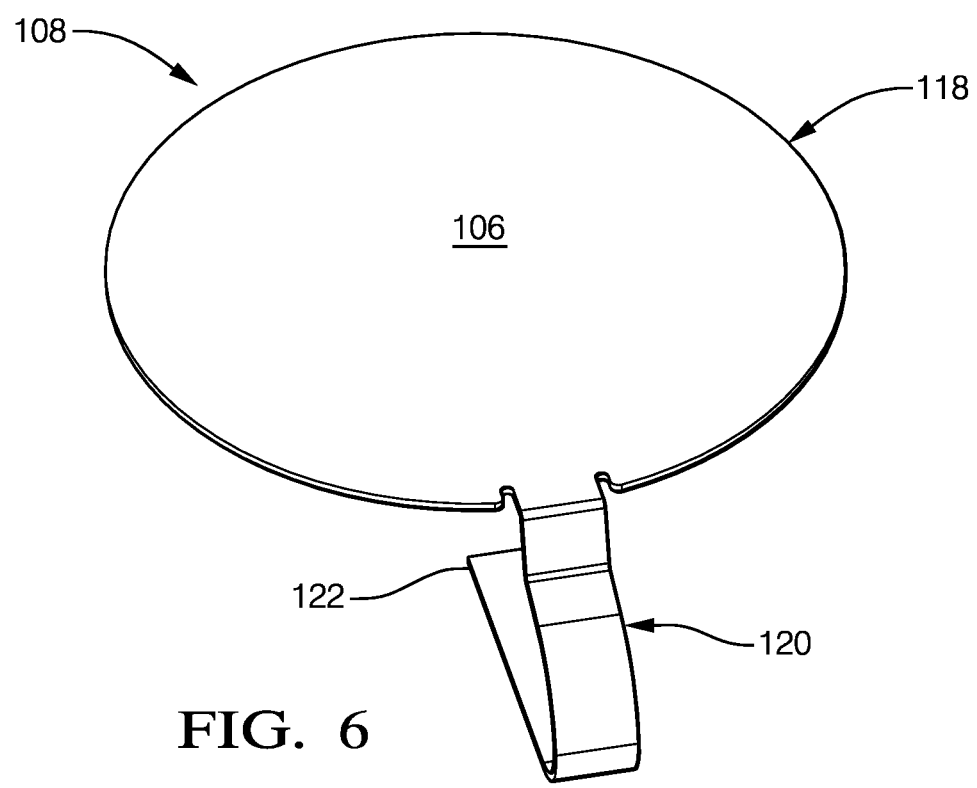
FIG. 6 illustrates an isometric view of the flexible substrate of FIGS. 3 and 4 in a formed condition defining the short range antenna on a top surface and EMI shield on the bottom surface as configured in the wireless power transmitter of FIG. 1 according to some embodiments.

FIG. 6 shows an isometric view of the flexible substrate 108 in a formed condition defining the short range communication antenna 102 on a top surface 106 and the EMI shield on the bottom surface 112. The bends in the elongated tail portion 120 are defined to place the FPC connector 122 in a desired location relative to other elements and may be selected based on the application. The tail portion 120 is also bent to closely cover the coil wire leads because the parallel traces 124 along the tail portion 120 may act as an electromagnetic interference comb filter over the coil wire leads. The coil wire leads may be noisy due to AC power flowing through the source coil 10.

Figure 7:
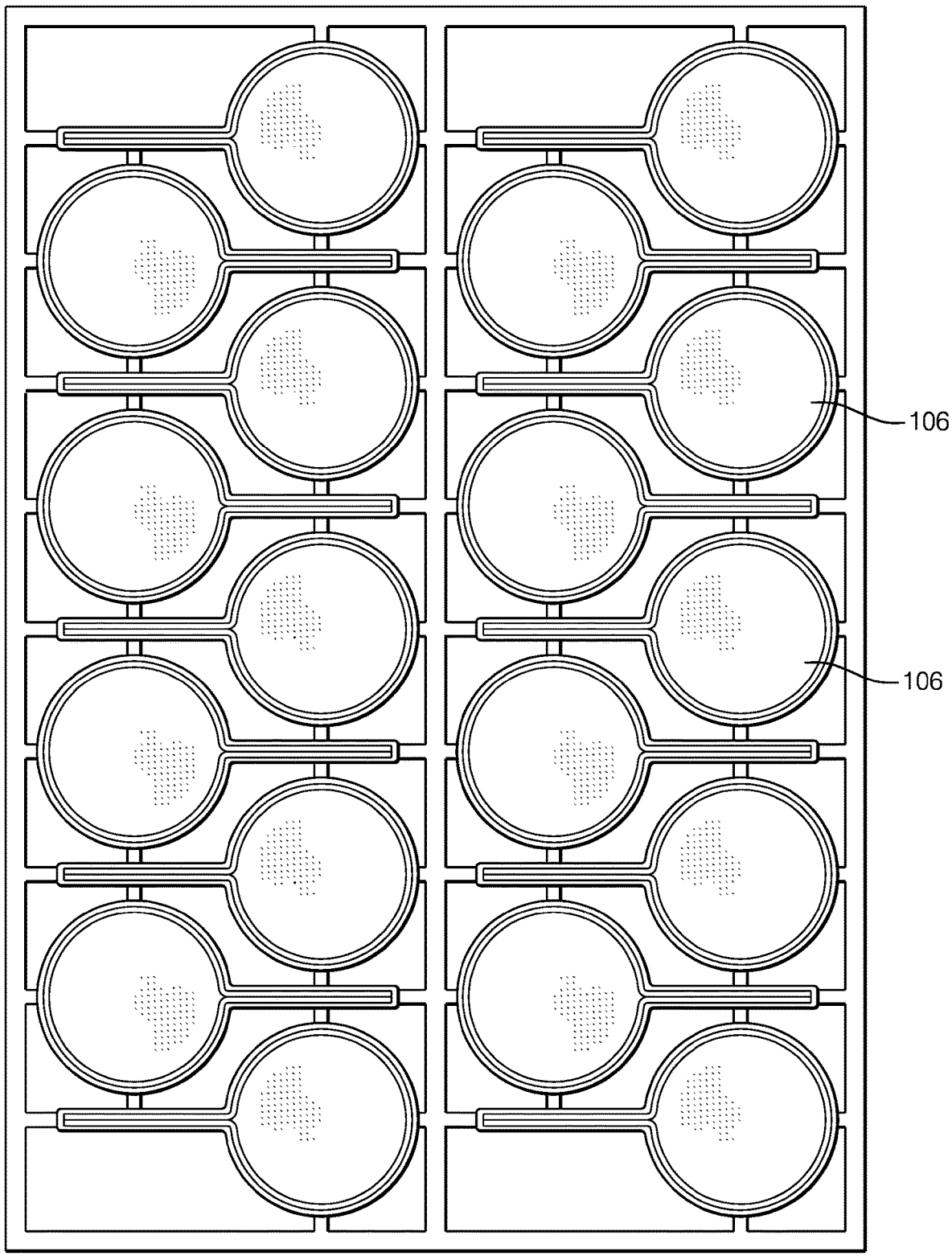
FIG. 7 illustrates a top view of an array of flexible substrates according to some embodiments.
Figure 8:
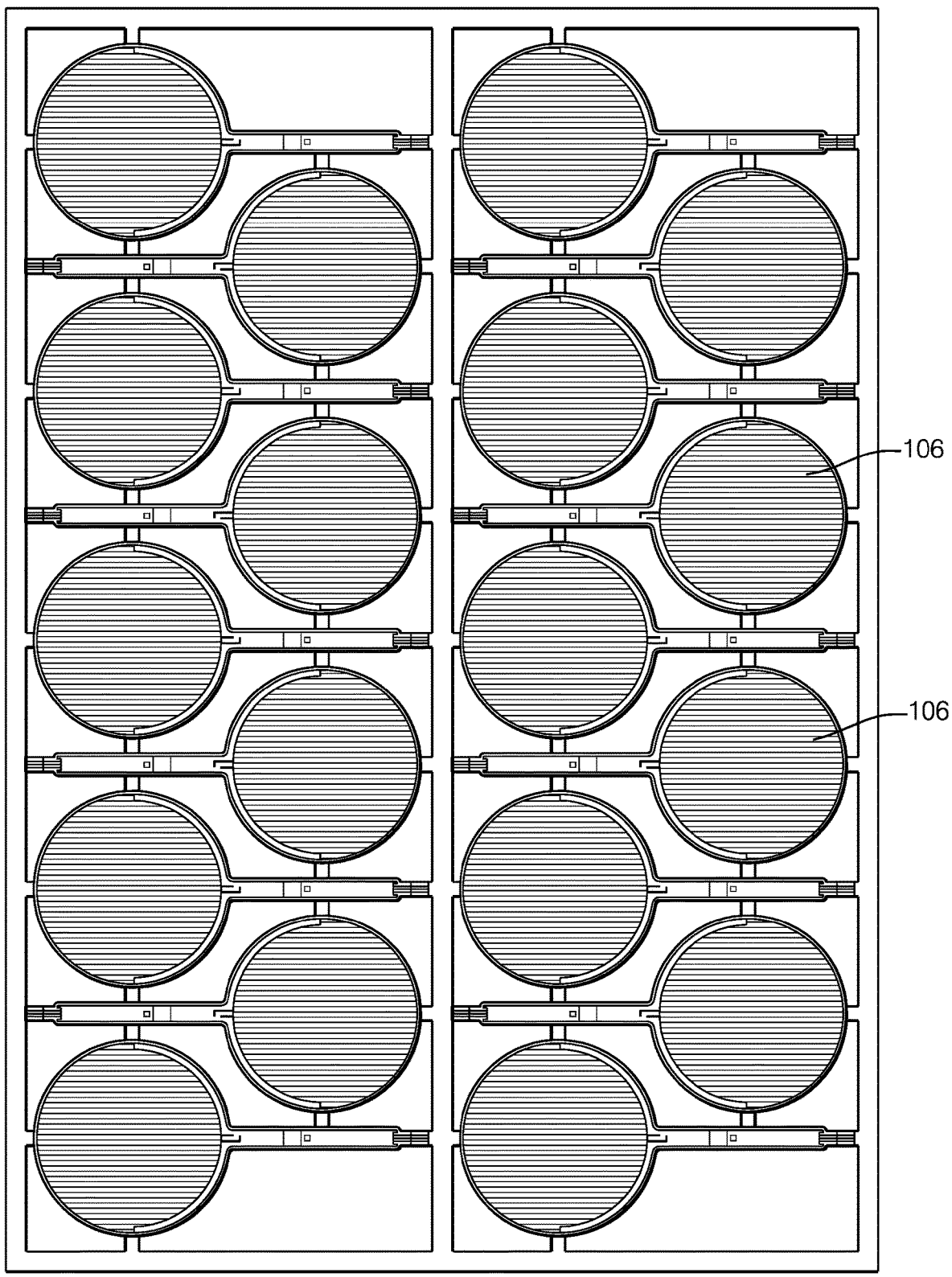
FIG. 8 illustrates a bottom view of an array of flexible substrates according to some embodiments.

FIGS. 7 and 8 show top and bottom views of an array of flexible substrates 108 as configured during the manufacturing process. Flexible substrates 108 are manufactured as planar substrates, wherein both the substantially round head portion 118 and the elongated tail portion 120 are coplanar or existing in a single plane.

In some embodiments, the short range communication antenna 102 is configured to inductively couple with a corresponding short range communication antenna in a wireless power receiver system (not shown) and operate in a frequency range centered at 13.56 MHz, for example conforming with the Near Field Communication standards which are based on International Standards Organization (ISO)/International Electrotechnical Commission (IEC) 18000-3 air interface standard at data rates ranging from 106 to 424 kilobits per second.

The wireless power transmitter 100 presented herein uses a thin and flexible circuit board substrate 108 that does not require a surface mount connector which is in contrast to prior wireless power transmitters that used either 1) a thick and rigid PCB with a surface mounted connector, or 2) a thin wire and EMI shielding sticker/applique for the NFC antenna and EMI shield.

The wireless power transmitter 100 presented herein allows the short range communication antenna to be very thin, which aids in maintaining a short distance between the alignment magnets in the wireless power transmitter 100 and the corresponding alignment magnets in the receiver to achieve a sufficient alignment and retention force. It also provides a short distance between the source coil 10 in the wireless power transmitter 100 and the receiver coil in the device being charged which increases the coil coupling between the coils. Increased coil coupling positively impacts charging performance and reduces associated additional heat loss which may also improve charge speed performance. Additionally, this increased coupling can enhance interoperability with market receivers resulting in an improved end user experience for some users, especially those with less popular receiver devices.

By terminating the traces 110 with a standard FPC connector 122, the short range communication antenna 102 may be connected to a single or double sided FPC connector 122 in the wireless power transmitter 100, which reduces cost by obviating the need for a more expensive surface mount connector on the substrate 108.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

DISCUSSION OF POSSIBLE EMBODIMENTS

The following are non-exclusive descriptions of possible embodiments of the present invention.

In some aspects, the techniques described herein relate to a wireless power transmitter including a source coil and a planar short range communication antenna overlaying the source coil. The antenna includes an antenna element disposed on a first surface of a flexible substrate and a plurality of parallel conductive traces disposed on a second surface of the substrate opposite the first surface. The plurality of parallel conductive traces extends across the substrate from a common shield ground bus proximate to or near to an outer edge of the second surface.

In some aspects, the techniques described herein relate to a method of assembling a wireless power transmitter, including the steps of providing a source coil, disposing an antenna element on a first surface of a flexible substrate and disposing a plurality of parallel conductive traces on a second surface of the substrate opposite the first surface, thereby forming a planar short range communication antenna, and arranging the planar short range communication antenna to overlay the source coil.

The system/method of the preceding paragraphs can optionally include, additionally and/or alternatively any, one or more of the following features, configurations and/or additional components.

In some aspects, the techniques described herein relate to a wireless power transmitter, wherein the antenna element forms several loops proximate to an outer edge of the first surface.

In some aspects, the techniques described herein relate to a wireless power transmitter, wherein the antenna element is a conductive trace arranged in a generally spiral shape.

In some aspects, the techniques described herein relate to a wireless power transmitter, wherein the conductive trace is formed of a copper film.

In some aspects, the techniques described herein relate to a wireless power transmitter, wherein a spacing between the spiral of the conductive trace is approximately equal to a width of the conductive trace.

In some aspects, the techniques described herein relate to a wireless power transmitter, wherein spacing between the spiral of the conductive trace is about 0.15 mm and a width of the conductive trace is about 0.15 mm.

In some aspects, the techniques described herein relate to a wireless power transmitter, wherein the plurality of parallel conductive traces is formed of a copper film.

In some aspects, the techniques described herein relate to a wireless power transmitter, wherein a spacing between each conductive trace in the plurality of parallel conductive traces is approximately equal to a width of each conductive trace in the plurality of parallel conductive traces.

In some aspects, the techniques described herein relate to a wireless power transmitter, wherein the spacing between each conductive trace in the plurality of parallel conductive traces is about 0.15 mm and the width of each conductive trace in the plurality of parallel conductive traces is about 0.15 mm.

In some aspects, the techniques described herein relate to a wireless power transmitter, wherein the substrate includes a polyimide, polyethylene terephthalate, or polyester film.

In some aspects, the techniques described herein relate to a wireless power transmitter, wherein the substrate has a thickness of about 0.05 to 0.5 mm.

In some aspects, the techniques described herein relate to a wireless power transmitter, wherein the substrate includes a substantially round head portion on which the antenna element and electromagnetic shield are disposed and an elongate tail portion containing an electrical connector and a plurality of consecutive traces connecting the electrical connector to the antenna element and electromagnetic shield.

In some aspects, the techniques described herein relate to a wireless power transmitter, wherein the short range communication antenna further includes at least one thermistor disposed on the substrate in a central region of the head portion which is connected to the electrical connector by at least a pair of dedicated conductive traces.

In some aspects, the techniques described herein relate to a wireless power transmitter, further including an array of magnets of alternating polarity surrounding the short range communication antenna.

In some aspects, the techniques described herein relate to a wireless power transmitter, wherein the short range communication antenna is configured to inductively couple with a corresponding short range communication antenna in a wireless power receiver system and operate in a frequency range centered at 13.56 MHz.

In some aspects, the techniques described herein relate to a method, further including forming several loops in the antenna element near an outer edge of the first surface.

In some aspects, the techniques described herein relate to a method, further including forming the antenna element from a conductive trace arranged in a generally spiral shape.

In some aspects, the techniques described herein relate to a method, further including forming the substrate to define a substantially round head portion on which the antenna element and electromagnetic shield are disposed and an elongate tail portion containing an electrical connector and a plurality of consecutive traces connecting the electrical connector to the antenna element and electromagnetic shield.

In some aspects, the techniques described herein relate to a method, further including disposing at least one thermistor on the substrate in a central region of the head portion and connecting the at least one thermistor to the electrical connector by at least a pair of dedicated conductive traces.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. A wireless power transmitter, comprising:
   a source coil; and
   a planar short range communication antenna overlaying the source coil, the antenna further comprising:
   an antenna element disposed on a first surface of a flexible substrate, and
   a plurality of parallel conductive traces disposed on a second surface of the substrate opposite the first surface, wherein the plurality of parallel conductive traces extends across the substrate from a common shield ground bus proximate an outer edge of the second surface and provide an electromagnetic shield for the antenna element, the substrate comprising a substantially round head portion on which the antenna element and the electromagnetic shield are disposed and an elongate tail portion containing an electrical connector and a plurality of consecutive traces connecting the electrical connector to the antenna element and the electromagnetic shield and the elongated tail portion being bent to locate the electrical connector on a bottom side of the wireless power transmitter.

2. The wireless power transmitter in accordance with claim 1, wherein the antenna element forms several loops proximate to an outer edge of the first surface.

3. The wireless power transmitter in accordance with claim 2, wherein the antenna element is a conductive trace arranged in a generally spiral shape.

4. The wireless power transmitter in accordance with claim 3, wherein the conductive trace is formed of a copper film.

5. The wireless power transmitter in accordance with claim 3, wherein a spacing between the spiral of the conductive trace is approximately equal to a width of the conductive trace.

6. The wireless power transmitter in accordance with claim 3, wherein spacing between the spiral of the conductive trace is about 0.15 mm and a width of the conductive trace is about 0.15 mm.

7. The wireless power transmitter in accordance with claim 1, wherein the plurality of parallel conductive traces is formed of a copper film.

8. The wireless power transmitter in accordance with claim 7, wherein a spacing between each conductive trace in the plurality of parallel conductive traces is approximately equal to a width of each conductive trace in the plurality of parallel conductive traces.

9. The wireless power transmitter in accordance with claim 8, wherein the spacing between each conductive trace in the plurality of parallel conductive traces is about 0.15 mm and the width of each conductive trace in the plurality of parallel conductive traces is about 0.15 mm.

10. The wireless power transmitter in accordance with claim 1, wherein the substrate comprises a polyimide, polyethylene terephthalate lor polyester film.

11. The wireless power transmitter in accordance with claim 1, wherein the substrate has a thickness of about 0.05 to 0.5 mm.

12. The wireless power transmitter in accordance with claim 1, wherein the short range communication antenna further comprises at least one thermistor disposed on the substrate in a central region of the head portion which is connected to the electrical connector by at least a pair of dedicated conductive traces.

13. The wireless power transmitter in accordance with claim 1, further comprising a circular array of magnets surrounding the short range communication antenna, wherein the planar short range communication antenna the circular array of magnets are arranged to be approximately coplanar.

14. The wireless power transmitter in accordance with claim 13, wherein the magnets in the circular array of magnets are of alternating polarity.

15. A method of assembling a wireless power transmitter, comprising:
 providing a source coil;
 disposing an antenna element on a first surface of a flexible substrate and disposing a plurality of parallel conductive traces on a second surface of the substrate opposite the first surface to provide an electromagnetic shield for the antenna element, thereby forming a planar short range communication antenna;
 forming the substrate to define a substantially round head portion on which the antenna element and electromagnetic shield are disposed and an elongate tail portion containing an electrical connector and a plurality of consecutive traces connecting the electrical connector to the antenna element and electromagnetic shield;
 arranging the planar short range communication antenna to overlay the source coil; and
 bending the elongated tail portion to locate the electrical connector on a bottom side of the wireless power transmitter.

16. The method in accordance with claim 15, further comprising forming several loops in the antenna element near an outer edge of the first surface.

17. The method in accordance with claim 15, further comprising forming the antenna element from a conductive trace arranged in a generally spiral shape.

18. The method in accordance with claim 15, further comprising forming the substrate to define a substantially round head portion on which the antenna element and electromagnetic shield are disposed and an elongate tail portion containing an electrical connector and a plurality of consecutive traces connecting the electrical connector to the antenna element and electromagnetic shield.

19. The method in accordance with claim 18, further comprising:
 disposing at least one thermistor on the substrate in a central region of the head portion; and
 connecting the at least one thermistor to the electrical connector by at least a pair of dedicated conductive traces.

\* \* \* \* \*